United States Patent
Doucette (10) Patent No.: US 10,437,447 B1
(45) Date of Patent: Oct. 8, 2019

(54) MAGNET BASED PHYSICAL MODEL USER INTERFACE CONTROL

(71) Applicant: Amazon Technologies, Inc., Reno, NV (US)

(72) Inventor: Jason Allen Doucette, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1249 days.

(21) Appl. No.: 14/230,051

(22) Filed: Mar. 31, 2014

(51) Int. Cl.
*G06F 3/0484* (2013.01)
*G06F 3/01* (2006.01)
*G06F 3/0481* (2013.01)

(52) U.S. Cl.
CPC .......... *G06F 3/04847* (2013.01); *G06F 3/016* (2013.01); *G06F 3/0481* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,633,076 B2 | 12/2009 | Huppi et al. | |
| 8,228,292 B1 | 7/2012 | Ruiz et al. | |
| 8,977,987 B1 | 3/2015 | Korn et al. | |
| 2004/0250217 A1* | 12/2004 | Tojo | G06F 3/0482 715/810 |
| 2005/0234676 A1 | 10/2005 | Shibayama | |
| 2007/0046630 A1 | 3/2007 | Hong et al. | |
| 2008/0040692 A1* | 2/2008 | Sunday | G06F 3/04883 715/863 |
| 2008/0119237 A1 | 5/2008 | Kim | |
| 2009/0303204 A1 | 12/2009 | Nasiri et al. | |
| 2010/0017489 A1* | 1/2010 | Birnbaum | G06F 1/1613 709/206 |
| 2010/0017759 A1 | 1/2010 | Birnbaum et al. | |
| 2010/0138766 A1 | 6/2010 | Nakajima | |
| 2010/0273542 A1* | 10/2010 | Holman, IV | H04M 1/0237 455/575.4 |
| 2010/0283750 A1* | 11/2010 | Kang | G06F 3/0416 345/173 |
| 2010/0295790 A1 | 11/2010 | Yu | |
| 2010/0313124 A1 | 12/2010 | Privault et al. | |
| 2011/0050730 A1* | 3/2011 | Ranford | G06F 1/1694 345/660 |
| 2011/0161884 A1 | 6/2011 | Dugan et al. | |
| 2011/0163971 A1* | 7/2011 | Wagner | G06F 3/04817 345/173 |

(Continued)

OTHER PUBLICATIONS

Non-Final Office Action dated Apr. 6, 2016, U.S. Appl. No. 14/230,072, 31 pages.

*Primary Examiner* — Toan H Vu
(74) *Attorney, Agent, or Firm* — Pierce Atwood LLP (57) ABSTRACT

Movement of a user interface (UI) element may be controlled through a magnet based physics model that controls movement of the UI element as if it were under a magnetic force. For a UI element that appears and disappears through device gestures, such as tilts, etc., the UI element may be controlled by one mimicked magnetic force that keeps it hidden and another mimicked magnetic force that keeps it visible, thus allowing the user to control the UI element with intuitive physical gestures using familiar physics-based magnetic behavior.

20 Claims, 8 Drawing Sheets

(56) References Cited

U.S. PATENT DOCUMENTS

| | | |
|---|---|---|
| 2011/0175930 A1 | 7/2011 | Hwang et al. |
| 2011/0291951 A1* | 12/2011 | Tong ................... G06F 3/0414 345/173 |
| 2011/0296334 A1* | 12/2011 | Ryu ..................... G06F 3/0483 715/776 |
| 2011/0307213 A1 | 12/2011 | Zhao et al. |
| 2012/0017147 A1* | 1/2012 | Mark ................... G06F 1/1639 715/702 |
| 2012/0056818 A1 | 3/2012 | Shafi et al. |
| 2012/0062604 A1 | 3/2012 | Lobo et al. |
| 2012/0154294 A1 | 6/2012 | Hinckley et al. |
| 2012/0174005 A1 | 7/2012 | Deutsch et al. |
| 2012/0290965 A1* | 11/2012 | Ignor ................... G06F 3/0482 715/777 |
| 2013/0069987 A1* | 3/2013 | Choe ................... G06F 3/0488 345/649 |
| 2013/0145290 A1* | 6/2013 | Weber ................. G06F 3/04883 715/760 |
| 2013/0174098 A1* | 7/2013 | Park .................... G06F 3/04815 715/848 |
| 2013/0201098 A1 | 8/2013 | Schilit et al. |
| 2013/0222276 A1* | 8/2013 | Kim ..................... G06F 3/0488 345/173 |
| 2013/0239056 A1* | 9/2013 | Ubillos ................. G06T 11/60 715/833 |
| 2013/0300437 A1* | 11/2013 | Grosjean ............ G01R 27/2605 324/661 |
| 2013/0321340 A1* | 12/2013 | Seo ....................... G06F 1/1641 345/174 |
| 2014/0125699 A1* | 5/2014 | Lotto .................... G06T 19/006 345/633 |
| 2014/0218393 A1* | 8/2014 | Lee ....................... G06F 3/0481 345/619 |
| 2014/0236777 A1 | 8/2014 | Bhogal et al. |
| 2014/0281954 A1* | 9/2014 | Ullrich ................ G06F 15/0291 715/702 |
| 2014/0310646 A1 | 10/2014 | Vranjes et al. |
| 2014/0368441 A1* | 12/2014 | Touloumtzis ........... G06F 3/017 345/173 |
| 2015/0019969 A1* | 1/2015 | Lee ..................... G06F 3/04842 715/719 |
| 2015/0029093 A1 | 1/2015 | Feinstein |
| 2015/0062178 A1 | 3/2015 | Matas et al. |
| 2015/0062179 A1 | 3/2015 | Matas et al. |
| 2015/0082181 A1* | 3/2015 | Ames .................. G06F 3/04815 715/738 |
| 2015/0268733 A1* | 9/2015 | Govindapillai ......... G06F 3/017 715/863 |
| 2015/0370529 A1 | 12/2015 | Zambetti et al. |
| 2016/0070342 A1* | 3/2016 | Taylor ....................... G06F 3/00 715/727 |
| 2016/0170598 A1* | 6/2016 | Zambetti ............... G06F 3/0485 715/784 |
| 2016/0170625 A1* | 6/2016 | Zambetti ............... G06F 3/0362 715/771 |

\* cited by examiner

MAGNET BASED PHYSICAL MODEL USER INTERFACE CONTROL

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

DETAILED DESCRIPTION

Certain computing devices may be configured with movement based user interfaces. Such movement based user interfaces may alter their appearance based on movement of the device displaying the user interface. In particular, user interface (UI) elements, such as panels, icons, cursors, or the like may be controlled through movement of the device. The movement of the device used to control the UI element may include tilting, shaking, or the like.

A number of different techniques currently exist to control behavior of UI elements through device movement. In one technique, movement of a device may be directly mapped to movement of the UI element, but use of such a technique makes it difficult to control the UI element as certain movements of the device, such as sudden movements, movements due to modes of transportation, etc. may cause undesired movements of the UI element, making the UI element difficult to control. In another technique, a friction based physical model translates device movement into UI movement by applying friction-type forces on the UI element, thereby slowing its movement in response to undesired sudden movement. A friction based physical model approach, however, may make it difficult to engage in precise control of a UI element, as extreme movements may be necessary to achieve the desired element movement and movement effects are dampened by the friction based model. In another technique, a Boolean model may interpolate device movement based on previous device behavior to determine a user intent based on the device movement. Such interpolation techniques may lead to incorrect responses by the UI, delayed performance of desired responses, or other problems. Other techniques have also been implemented.

Figure 1:
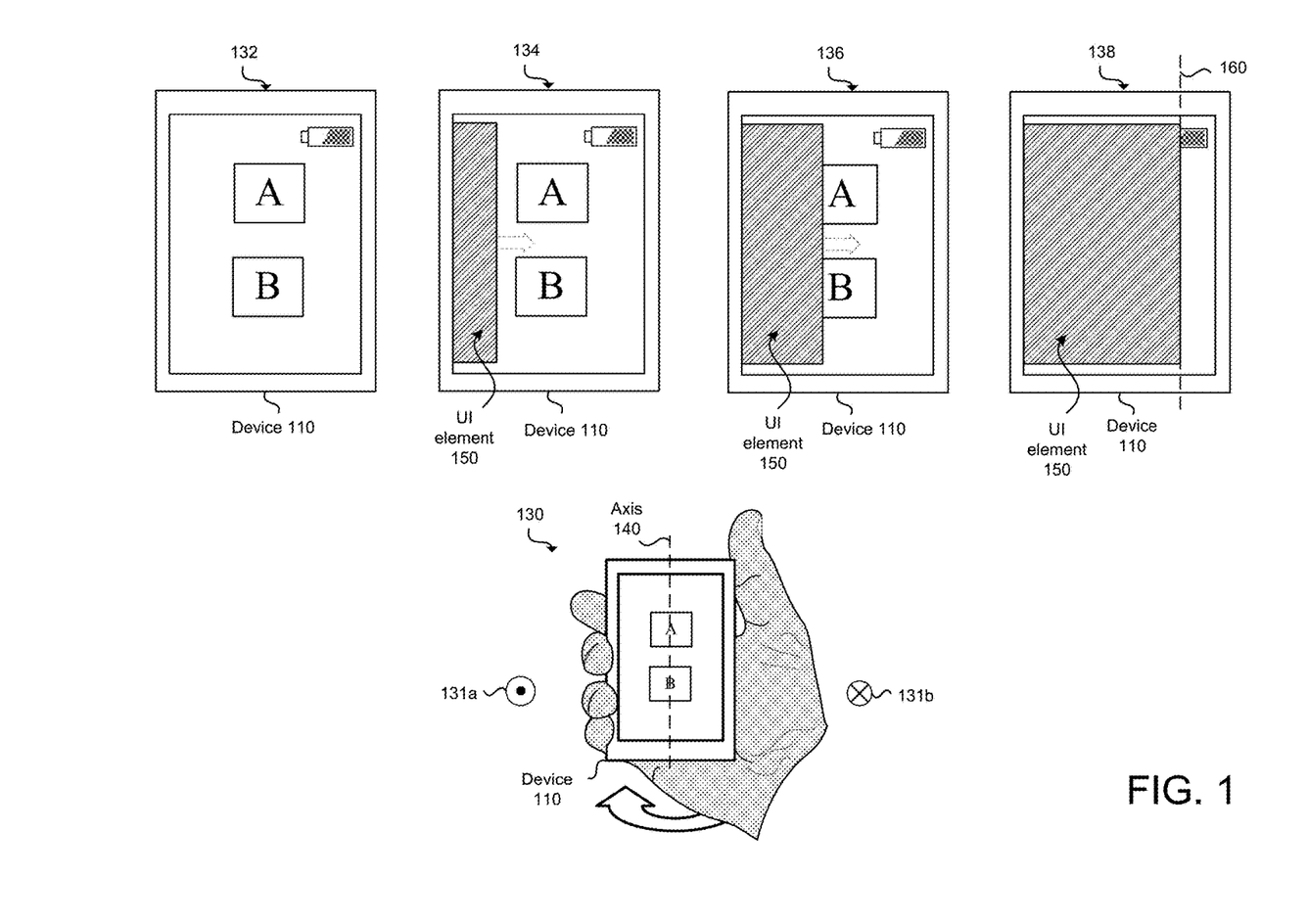
FIG. 1 illustrates an example of a device implementing a magnet based physical model for controlling a user interface according to one aspect of the present invention.

To illustrate controlling a UI element using device movement, an example of a UI element of "sliding" UI panel is used. In the sliding panel example, a UI of a device may include a UI element that behaves like a panel that may appear to slide on and off the display screen of a device. The user may control sliding of the panel by rotating the device along an axis through the device. For example, as shown in FIG. 1, a device 110 display a UI (displaying generic icons "A" and "B") may be held by a user as shown in illustration 130. In order to activate the appearance of the sliding panel the user may "flick" his/her wrist so the fingers of the user's hand move in one direction around a long axis 140 of the device 110 and the user's thumb moves in a different direction around the long axis 140 of the device 110. Thus the left side of the device 110 travels up in the plane of view (illustrated by directional indicator 131*a*) and the right side of the device 110 travels down in the plane of view (illustrated by directional indicator 131*b*). Using this movement the user may "flick" a sliding panel to appear on the device. As shown in illustration 132, prior to the flicking movement the panel does not appear on the display of the device 110. When the movement begins, as shown in illustration 134, the UI element 150 may appear on the display of the device and appear to be traveling from left to right. As the movement of the device 110 along the axis 140 continues, the panel moves farther along the screen from left to right (shown in illustration 136) until coming to rest at a final position, shown by illustration 138. At its final position, the UI element 150 may cover a portion of the display of the device 110 (for example covering icons A and B). Although the panel is illustrated as shaded, it may itself include other actionable UI elements such as icons, etc. Further, although a sliding panel is shown for purposes of illustration, the techniques described here may be used with a wide variety of UI elements controlled by device movement, whether those UI elements originate from different sides of a device (up, down, left, right), whether they exist entirely on the display and do not "appear" from off-screen, move in different directions, move in response to different device movements (i.e., shaking, tilting via pitch/roll/yaw), etc.

Using traditional device-based UI movement controls, controlling the UI element 150 of FIG. 1 may be difficult, resulting in the panel not responding in a way that is intuitive and desired by a user. For example, the panel may appear when the user does not wish the panel to appear, for example when the device is moved either accidentally or during control of the device when the panel's appearance is undesired. In another example, the panel may not appear when the user does desire the panel to appear, such as when the user moves the device attempting to activate the panel but the panel fails to appear and/or move. In this example, the panel may not even appear briefly (i.e., "peek" out from the side of the display) resulting in the user having no feedback regarding why the panel didn't appear (i.e. was the device movement insufficient, in the wrong direction, too fast, etc.). In another example, the user may attempt to activate one panel, but another appears. In this example multiple panels may be available (for example one appearing from the left of the display, another appearing from the right), but the user's motion activates the wrong panel, perhaps a result of the device recognizing the end of a user's desired movement rather than the beginning (as each device movement recorded by device sensor's may have an equal but opposite movement recorded following the end of a desired movement). Other UI element control problems may exist using existing techniques.

To solve for these problems, a technique is offered to control movement of UI elements using a magnet based physical model. Using this technique, which mimics manipulation of a physical device using magnets, control of UI elements based on device movement may be improved. As explained below, while the UI element is in between a first position (for example, off screen) and a second position (for example, the panel being halfway open) the panel acts as if a first magnetic force is being applied to it, pulling the UI element toward the first position. While the UI element is in between the second position (for example, the panel being halfway open) and a third position (for example, the panel fully open) the panel acts as if a second magnetic force is being applied to it, pulling the UI element toward the third position. In the example of FIG. 1, the magnetic forces may be illustrated by imagining a magnet along the right edge of the panel, and two other magnets, one magnet off screen to the left of the device and another located at line 160 (shown in illustration 138) marking the panel's fully open position. While the panel is between being off-screen and halfway open, the two magnets attract each other. Thus, when the panel is between these points the device applies a first magnetic-type force to attract the panel to being off-screen. However, once the panel passes the half-way open point (or some other selected position), the first magnetic force may be discontinued (i.e., the first magnet is "turned off") and a second magnetic force may be applied, where the second magnetic force pulls the panel open (i.e., the second magnet is "turned on"). Thus the UI element may move based in part on the movement of the device and in part based on application of the magnetic forces. Such magnetic forces may be used to control various UI elements such as moving sliding panels, turning pages in an ebook, browsing images in a photo album, etc. As explained below, this configuration of applied forces to a UI element may provide improved user control of UI elements.

Movement of the UI element may be based on a combination of the forces described above and movement of the device. To determine the portion of the UI element's movement attributed to the device, the device may use data from its various sensors. For example, a device may use data from its gyroscope(s) to determine rotational data as to how a device is being twisted, etc. and data from its accelerometer(s) to determine acceleration stop, start, and other data to determine when and how to move a UI element from one position to another. In one aspect, techniques such as head tracking and/or frictional movement may be ignored to focus on the magnet based physical model for controlling the UI element. The movement of the device may be directly translated into movement of the UI element (i.e., panel) rather than interpolating the movement and then deciding whether the panel should open or remain closed. Thus the panel may appear to move with the device in substantially real time. In another aspect, head tracking may be considered along with the magnetic forces when controlling the UI element in order to effect a more user-centric control of the UI element.

As described above, application of the first force keeps the UI element favored toward the first position (i.e., off-screen) and application of the second force keeps the UI element favored toward the third position (i.e., fully open). The strength of the magnetic forces applied to the panel may vary depending on how far the UI has moved between one position and another. For example, the force applied to the panel in the fully closed position may be higher than the force applied to the panel while it is one-quarter open. Configuration of these variable force strengths is described in more detail below. Thus, the magnetic forces applied to the panel provide a "stickiness" factor that may reduce unnecessary opening/closing of the panel. Application of the forces makes it less likely that the panel will appear then disappear in quick succession, likely as a result of a device motion in one direction then in the opposition direction. Thus in this arrangement, the panel is less likely to fully open as a result of undesired movement (for example, movement caused by bumps in a bus ride). And even if a panel does attempt to open in such a scenario, it may only open slightly, and then return to being off-screen as a result of the first magnetic force. Similarly, the panel may be less likely to close (i.e., go off-screen) when the user does not wish to close it.

By arranging the "magnets" to respectively turn on/off when the panel is partially open (at some selected point between fully open and fully closed), a discontinuity is created that results in the panel not remaining partially open. This results in a desirable operation of either closing or opening the panel, and not creating user frustration in being unable to get the panel to go one way or the other. Further, by allowing the panel to appear on screen slightly and then get pulled back off screen (rather than simply interpolating a binary decision to either bring the panel out or keep it off-screen) the user is provided with feedback, indicating that some device movement sufficient to control the panel was recorded, even if that movement was insufficient to fully activate the panel. The user may thus adjust the movement of the device to more accurately control the panel if so desired. In addition, other user feedback may be offered in the form of audio and/or haptic (i.e., vibration) feedback when a panel opens, closes, or otherwise moves. For example, the device may emit a noise, such as a "click," or vibrate when the panel reaches the fully open or fully closed position. Another noise or vibration may be emitted when the panel is moving between being open and closed. In this manner the user may receive additional feedback on movement of the UI element, adding another "physical" dimension to controlling movement of the UI element. This feedback may also notify the user if device movement has caused the panel to move when the user was not expecting panel movement.

The movement of the panel may be calculated as a function of the panel's position and momentum (as in the speed of the panel times its mass). To determine a momentum of the panel, a mass may be assigned to the panel by the system. The mass may be selected/adjusted to achieve the desired movement behavior of the panel under various conditions. The panel may be accelerated in response to movement of the device. Depending on the configuration of the system, certain movements of the device may accelerate the panel in certain directions. As the sensors on the device may be capable of frequent calculations of the device's acceleration, the panel's acceleration may be calculated with similar frequency, enabling the panel to be responsive to slight changes in the device's orientation/acceleration. For example, calculations of the panel's acceleration may be performed at a rate of 60 times per second, or at some other rate depending on device configurations.

The system may calculate the portion of the panel's acceleration/movement originating from the movement of the device (as opposed to that originating from application of one of the magnetic forces) proportional to the movement of the device. Or the system may process the movement of the device to normalize the device's movement prior to applying the device's movement to the panel (for example, normalizing extreme movements of the device or adjusting certain device movement over time). Such normalization may reduce undesired panel behavior, such as the panel appearing and then disappearing in a short time period. Thus, in the normalized case, graphical movement of the UI element may be based on dampened physical movement of the device. The two may be combined as well, where graphical movement of the UI element is based on proportional physical movement of the device up to a certain point, after which the graphical movement of the UI element becomes based on dampened physical movement of the device. This combination may be selected, for example, when a movement of the device starts at a certain speed but then accelerates rapidly.

Behavior of UI elements may be modeled after physical world movements so as to improve user control of the UI. Although various physical values (such as mass, momentum, force, etc.) are described herein, it is understood that these descriptions are for illustration purposes, and such physical values may be estimated/fictionalized in the context of the electronic user interface of the device.

The system may also configure the UI element's behavior (including translation of movement of the device to UI element movement, adjusting the UI element's mass, adjusting the magnetic forces, etc.) based on an operating state of the device. For example, if the device is displaying a home screen of an operating system (OS) the UI element may behave in one manner, but if the device is running an application that involves frequent moving of the device (for example a driving game) the UI element may operate differently, for example to prevent the UI element from appearing unnecessarily during operation of the game. Different configurations of the UI element operation are possible and may be determined by the device, user, etc.

Figure 2:
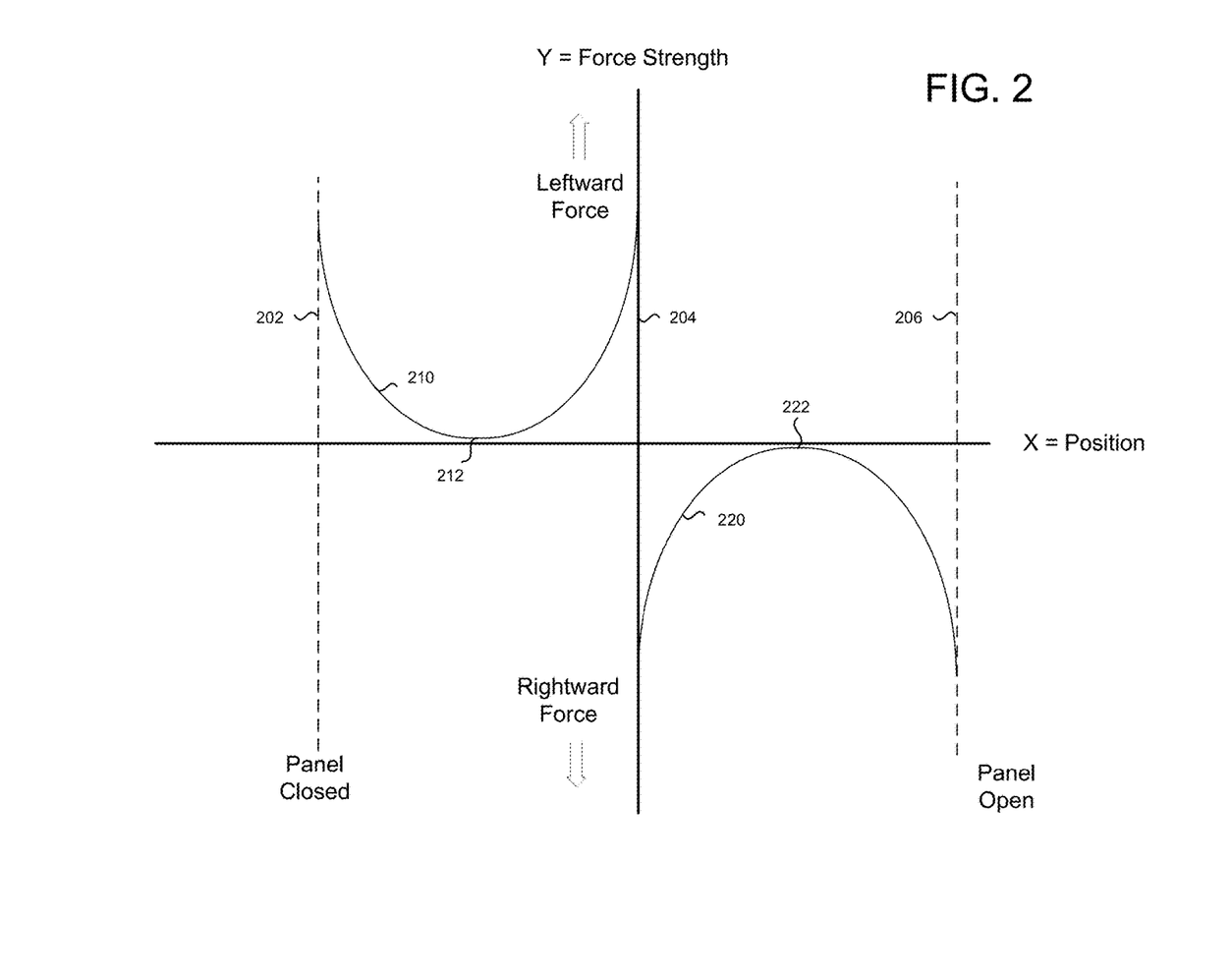
FIG. 2 illustrates an example of simulated magnetic forces to apply to an element of a user interface according to one aspect of the present disclosure.

Behavior of the magnetic forces applied to the panel in various positions may be represented graphically, as shown in FIG. 2. The graph shown in FIG. 2 illustrates the two magnetic forces that may be applied to the panel illustrated in FIG. 1. While the graph in FIG. 2 is aligned for the panel of FIG. 1 (as in a panel that comes in from the left hand side of the display), other versions of the graph of FIG. 2 may be applied for different UI elements depending on how the system wishes to apply the forces to affect the UI element's movement.

As shown in FIG. 2, the force applied to the panel may vary with the position of the panel. Position of the panel is represented by the X axis. While the relative position may be configured as desired, for present purposes the value of the X axis at line 202 represents the panel being closed (i.e., fully off-screen, such as corresponding with image 132), the value of the X axis at line 204 represents the panel being halfway open, and the value of the X axis at lien 206 represents the panel being fully open (i.e., displayed on screen to the fullest ability of the panel, such as corresponding with image 138). Position may be measured from any position of the panel itself, for example the rightmost edge of the panel. As illustrated, line 202 may be considered to be at X=−1 and line 206 may be considered to be at X=1. Thus X=−1 corresponds to the panel being closed, X=1 corresponds to the panel being open and X=0 (represented by line 204) corresponds to the panel being halfway between open and closed.

Figure 3:
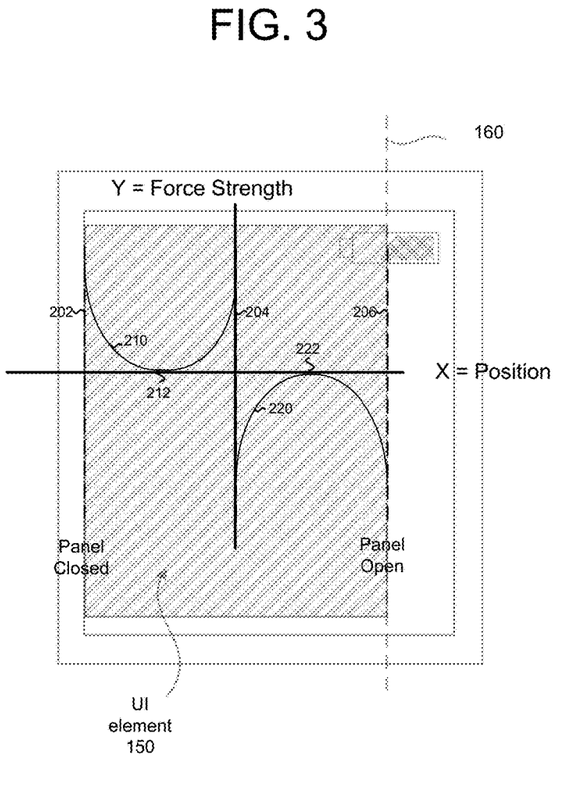
FIG. 3 illustrates application of magnetic forces to a user interface according to one aspect of the present disclosure.
Figure 4A:
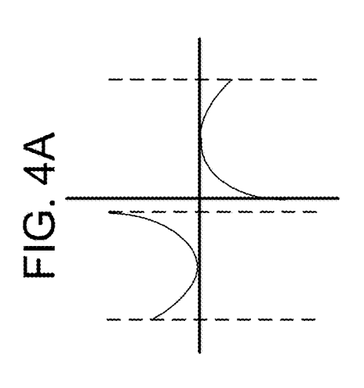
FIGS. 4A-4F illustrate example simulated magnetic forces to apply to an element of a user interface according to one aspect of the present disclosure.
Figure 4B:
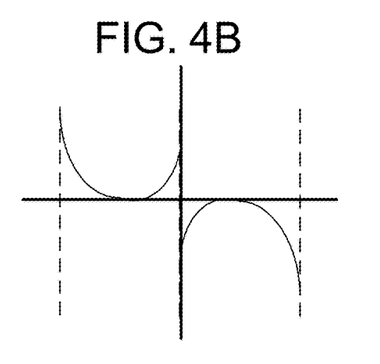
Figure 4C:
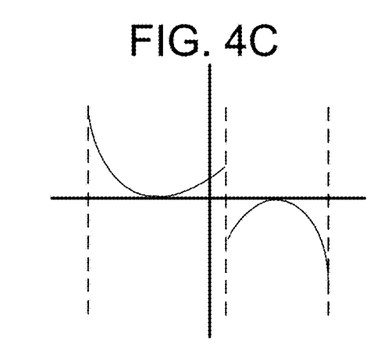
Figure 4D:
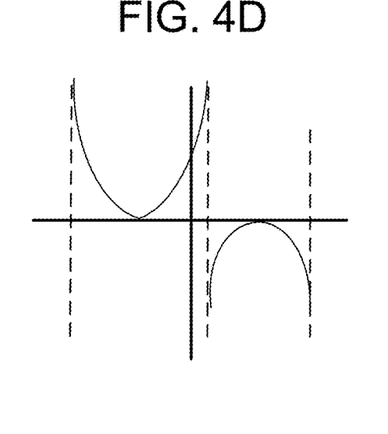
Figure 4E:
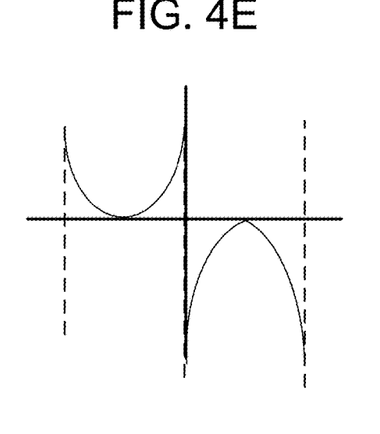
Figure 4F:
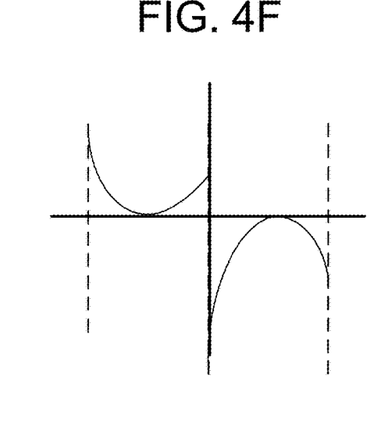

The Y axis of FIG. 2 represents the force applied to a UI element with a positive Y value representing a leftward force (i.e., pulling the UI element closed/off-screen) and a negative Y value representing a rightward force (i.e., pulling the UI element open/on-screen). The first force, represented by graphed line 210, shows the leftward magnetic force that may be applied to the UI element when it is in between position 202 and 204. The second force, represented by graphed line 220, shows the rightward magnetic force that may be applied to the UI element when it is between positions 204 and 206. As can be seen the force is represented as a parabolic graph, roughly approximating a quadratic or other non-linear function that may simulate a magnetic force. For example, the first force, $F_1$, may be presented by the following equation: $F_1 \approx (p+O_1)^2$ where p is the position of the UI element and $O_1$ is a first offset that locates the first force graph along the x axis so the force is applied at the desired position. The second force, $F_2$, may be represented by the following equation $F_2 \approx -(p+O_2)^2$ where $O_2$ is a second offset that locates the second force graph along the x axis so the force is applied at the desired position. Thus, the forces may be based on a quadratic function of the position of the UI element. For example, the forces may be proportional to a quadratic function of the position of the UI element, may be a distortion of the quadratic function of the position of the UI element, or the like. As illustrated, these forces may depend on the position of the UI element, but may be independent from other factors such as device movement, user contact with a touchscreen, etc. FIG. 3 illustrates the graph of FIG. 2 laid over the tablet image 138 to illustrate the applying of force to different positions of the UI element (for example as relating to the position of the rightmost edge of the panel).

Using the examples of FIGS. 1-3, the movement of the panel may be described as follows. A panel 150 starts in a first (closed) position as shown in image 132. At that first position, although the panel is "off screen" the rightmost edge of the panel may be considered to be aligned with the left border of the display of the device 110. As the illustrated panel is configured to open while traveling from left to right, the rightmost edge of the panel may be considered the leading edge of the panel. Upon the device 110 experiencing a rotational movement, shown in image 130, the panel 150 accelerates causing the leading edge of the panel to appear on screen and causing the panel 150 to move rightward toward open position 160, as shown in image 138. The acceleration of the panel 150 is based on the rotational movement of the device. Thus the force caused by the rotational movement of the device may result in a movement vector pulling the panel 150 rightward. As the panel 150 travels rightward, a portion of the panel 150 becomes visible between the leading edge of the panel and the left border of the screen. That portion increases (as shown in images 134 and 136) as the panel 150 goes from the closed position (in image 132) to the open position (in image 138).

As the leading edge of the panel moves between first (closed) position 202 to a second, or intermediate, position 204, the panel 150 is acted upon by a first simulated magnetic force (illustrated by force curve 210) pulling the panel toward the closed first position, illustrated by image 132. The first simulated magnetic force causes the panel 150 to decelerate as it travels rightward. Thus the first simulated magnetic force causes the panel's movement vector to decrease in value as the panel 150 travels from first position 202 to second position 204. As shown in FIG. 2, the first simulated magnetic force is a quadratic function based on the panel's position (in particular the position of the leading edge of the panel) with the force being strongest when the leading edge is at positions 202 and 204 and the force being weakest when the leading edge is at position 212. Thus, as the leading edge of the panel travels from position 202 to position 212, the first simulated magnetic force is decreasing and as the leading edge of the panel travels from position 212 to position 204, the first simulated magnetic force is increasing. If the force acting on the panel 150 from the rotational movement of the device 110 is sufficient to carry the leading edge of the panel 150 from first position 202 to second position 204 (even while the panel 150 decelerates due to the first simulated magnetic force), once the panel reaches second position 204, the first simulated magnetic force stops acting on panel 150 and the second simulated magnetic force (illustrated by force curve 220) takes over.

As the leading edge of the panel 150 moves between second position 204 to third (or open) position 206, the panel 150 is acted upon by the second simulated magnetic force pulling the panel toward the open third position 206, as illustrated by image 138. The second simulated magnetic force causes the panel 150 to accelerate as it travels rightward. Thus the second simulated magnetic force causes the panel's movement vector to increase in value as the panel 150 travels from second position 204 to third (open) position 206. Once the panel 150 reaches the third position 206, and becomes fully open, the panel's movement vector will become zero. As shown in FIG. 2, the second simulated magnetic force is a quadratic function based on the panel's position (in particular the position of the leading edge of the panel) with the force being strongest when the leading edge is at positions 204 and 206 and the force being weakest when the leading edge is at position 222. Thus, as the leading edge of the panel travels from position 204 to position 222, the second simulated magnetic force is decreasing and as the leading edge of the panel travels from position 222 to position 206, the first simulated magnetic force is increasing. Once the panel 150 is fully open (that is the leading edge of the panel 150 is located at position 160/206) the second simulated magnetic force continues to hold the panel 150 open at position 206 with the force illustrated in FIGS. 2 and 3. If the device 110 experiences a rotational movement in the appropriate direction sufficient to move the panel 150 off the open position 206, the panel will be carried leftward toward the closed position 202, with the second simulated magnetic force acting on the panel as the rightmost edge of the panel (still considered the leading edge for illustration purposes even though the panel is now traveling in the opposite direction) travels from third (open) position 206 to second position 204, and the first simulated magnetic force acting on the panel as the rightmost edge of the panel travels from second position 204 to first (closed) position 202.

As can be envisioned, the specific forces and their corresponding graphs may be configured in various ways to achieve a desired operation. For example, the first force and second force may be differently applied to make the panel more difficult to open than to close. In another example, the first force and second force may be applied to make the panel less likely to appear on the display, but more likely to fully open if it does appear on the display. In other configurations, it may be desirable to pull the panel closed with more force than pulling the panel open (or vice versa). In those situations the forces and lines 202, 204, and/or 206 may be rearranged to have the forces acting as desired. FIGS. 4A-4F illustrate different possible force graphs for left sliding panels. Many different forces may be applied many different ways for different UI elements.

Further, although the forces are illustrated as acting upon a UI element in one dimension (i.e., either left or right), various forces may be configured for multiple dimensions. For example, various simulated magnetic forces may be configured to pull a UI element in different directions along an XY axis of a display. Those forces may be dependent upon the UI element's position on the XY axes. Further, various simulated magnetic forces may be configured to pull a UI element in different coordinates along an XYZ axis of a three-dimensional display (for example a device configured to show icons in simulated 3D, etc.). Those forces may be dependent upon the UI element's position on the XYZ axes.

The configuration of the forces may establish an initial force threshold such that forces applied to the device that are under the initial force threshold may not be sufficient to move the UI element (such as the panel) from its resting position (i.e. fully open or fully closed). Or, in another aspect, such an initial force threshold may be implemented separately from the discussed simulated magnetic forces. Device movement that falls under the initial force threshold may then be used for other purposes of device operation, such as moving other more-sensitive UI elements, altering the UI in other ways (for example to illustrate tilt effects), etc.

Further, although the system is illustrated as having device movement control a UI element that is displayed on the device that is being moved, the techniques herein may be applied to control a UI element on a display remote from the device being moved. For example, movement of a mobile device may be used to control a UI element on a remote television. In this scenario, the magnetic forces would be applied on the UI element on the display of the remote device (i.e., television) and the UI element would move based in part on the movement of the mobile device and in part based on application of the magnetic forces as configured on the display of the television.

The application of simulated magnetic forces to UI elements may be configured as part of an OS, may be specific to particular applications, operating conditions, etc. The magnetic forces may also be based on a user's device operation history (such as how the user interacts with the UI element in question), user setting (such as a user specifically configuring the forces in a particular manner), or other factor. A number of default settings may be configured to set the forces. The force settings may also be adjusted in runtime by a device or user. To configure operation of the forces (and/or the resulting graphs of those forces), as well as other variable parameters in controlling UI elements with a magnet based physical model (such as force direction, element mass, under what circumstances to set what variables, etc.), many different data samples may be considered and analyzed to determine what different operating conditions result in desired UI element movement.

As part of system configuration, the system may analyze a large data set (for example, thousands of data samples) representing different examples of users operating devices. The data set may include training data points, for example data points where the system knows the user's intent, or data taken during runtime where the user's intent may be inferred. The different examples are each associated with data from various sensors (gyroscope, accelerometer, etc.) describing the motion of the device during operation. Ideally, the sensor data is taken at a resolution the same or higher than the resolution of operation of UI elements during runtime (for example, 60 times per second). The different examples may be associated with descriptions of the operation and operating conditions. The different examples may include positive examples (i.e., instances where a user is trying to access the panel) such as a user attempting to access the panel while sitting, walking, on a bus, in a car, while operating a certain application, from a home screen, etc. The different examples may also include negative examples (i.e., instances where a user is not trying to access the panel) such as a user showing a device to a friend, putting a device on table, just walking, sitting in a car/bus, playing a video game, etc. These positive and negative examples may be extended to other desired results such as closing a panel, opening multiple panels, operating the device in a way not intended to close a panel, etc. Different example sets may be gathered for interactions related to different conditions, different movements, operation of different UI elements, etc.

For the example of opening a panel, depending on operating conditions the device may generally wish for the panel to behave in one of three ways: (1) open the panel fully, (2) keep the panel closed, and (3) open the panel slightly but then return it to the closed position. The system may wish to result in conditions 1 and 2 when the user wishes to arrive at conditions 1 and 2. That is, the system may be configured to open the panel when the user wants it open and may be configured to keep the panel closed when the user wants it closed. To achieve this, the system may analyze the various data sets and set the movement variable parameters (force strength, etc.) to achieve the desired result for the specific conditions. The variable parameters may be configured to change values for different operating conditions (for example one setting for riding in a bus, another setting for playing video games, another setting for operating the device while stationary, etc.). This may result in different force graph configurations, such as those shown in FIGS. 4A-4F, to be applied in different circumstances. To set the different values of the variable parameters.

It may not be possible to arrive at settings that achieve the desired result in every condition. In those circumstances the variables may be set to capture as many positive results as possible with certain outliers resulting in condition 3 above, namely the panel opening slightly then closing. While condition 3 is not ideal, if the user experiences condition 3 in certain circumstances, the user may learn that the specific movement of the device was in between causing the panel to open fully or causing the panel to remain out of view and may adjust operation of the device to achieve the desired result in the future (for example, moving the device with more force or keeping the device more still).

To set values for the parameters evolution theory or machine learning may be applied to measure the parameters (e.g., sensor data) when analyzing the data sets, and what values of the parameters may result in the desired operation of the UI under the specified conditions. Using machine learning, the parameters of pre-stored UI events may be analyzed with a priori knowledge of whether actions resulting in the UI events were intended to allow comparisons of future run-time data to models based on the existing data set. Evolution theory may be used to evolve the run-time models based on the parameters. A device may be initially configured with a model, but the model will evolve based on alteration of the parameters associated with the model and testing the device behavior based on the altered parameters. The testing may use real-time data or may use data from stored data sets. Various parameters may continue to be altered to continue evolution of the model. The evolved model with the most desired results in terms of device movement to UI element control, may be implemented for future control of the UI element.

Parameters that may be measured may include (but are not necessarily limited to):

The strength of the force to be applied at various position points (for example 6-20 different positions between panel open and panel closed may be considered);

A dampening factor (as in, how much of the movement of the device should be dampened under certain conditions). That is, if a user moves the device with 10× the normal power, how should that translate into simulating the physics of the UI element;

Continuation power (When a strong gesture is made, it results in a large strength over a small time, instead of a reasonable amount of power over a longer time. If the strong power is dampened, power is lost as its longevity is diminished. To avoid this, the power's life may be configured to last longer.); and Strength of sensor data (i.e., accelerometer, gyroscope, etc.) associated with certain conditions.

Selected parameters may be applied to a subset of data samples. The data may be divided in a number of different kinds of subsets. The system may analyze data associated with actions according to a priority. The priority may be human-selected, for example first processing data associated with situations determined to have a high priority for correct processing (for example, processing data associated with a stationary user prior to processing data associated with a user on a bus ride). The priority may also be determined through an automated algorithm to dismiss like-gestures (i.e., avoid repeatedly processing similar data) so the system can focus on more unique results.

For each device interaction (i.e., each data sample) the system may consider the value of each selected parameter, the behavior of the UI element being analyzed (such as the panel) and whether that UI element behavior matched the user's intent (that is, did the UI element do what the user wanted under the communication conditions. For each particular UI element behavior (panel opened when desired, panel closed when desired, etc.), each data sample that resulted in the UI element behavior that matched with user intent may be collected, and the parameters of each such data sample analyzed to model the device settings associated with the UI element movement matching the user intention. Such data samples may also be used to associate a score with the particular parameter measurements. The samples may be processed further (for example, divided with random parameter variations and retested).

When the models, scores, and other indicators are processed, the system may train/configure the system to move the UI element under certain conditions in a certain way as indicated by the models, scores, etc. so that the UI elements moves as intended by the user. Thus a model describing certain sensor data may correlate to UI element movements that correspond to device movement described in the sensor data. Devices may be configured with the models. Thus, during runtime, sensor data generated by a device may be compared to one or more models to determine how the UI element of the model should be moved based on the sensor data. The configurations resulting from the above process may be distributed to multiple devices either upon manufacture of the device, or at some later time. Such configurations may include various force graphs, such as those illustrated in FIGS. 4A-4F, to be used in certain conditions. The configuration settings may then be used by devices during runtime (rather than the devices individually having to individually interpolate historical data every time device movement is to be processed). The above configuration process may also be iterative, such that the system may continuously analyze data samples to improve the configuration used by devices.

Devices may also re-train/adjust the configurations during runtime operations to configure UI element movement based on the movement habits of a device's individual user. Data taken during runtime may not include the same information as pre-set training data, such as a priori knowledge of a user's intent. In that situation missing information may be ignored or inferred. For example, if a user performs a device movement that does not result in UI element movement (such as the panel appearing), then shortly thereafter the user repeats the device movement, only with a larger force, resulting in the UI element movement, an inference may be made that during the first movement the user intended the panel to appear. Further, if a UI element moves to a first location and then back to a previous location (for example, the panel opens then closes) during a short timeframe, the system may infer that the device movement that caused the UI element to move to the first location should not have caused the UI element to move and the system should be adjusted. Other techniques for determining user intent (i.e., head tracking, face recognition, etc.) may also be used. In this manner, configuration settings (such as force graphs) may be dynamically adjusted during device runtime and configured for specific users and device operation conditions.

Data acquired by devices during runtime may also be sent to one or more remote systems for processing by a central service that considers and analyzes runtime data and disseminates the results to various user devices. In this manner the system may keep its configurations up to date. This may also allow central specialized configurations for categories of users based on user characteristics. For example, if the system determines that users over the age of 65 create different device movement data when attempting to move certain UI elements than users between the ages of 14 and 21, the system may create user-specific or user-category-specific configurations that may be distributed to the appropriate devices.

Figure 5:
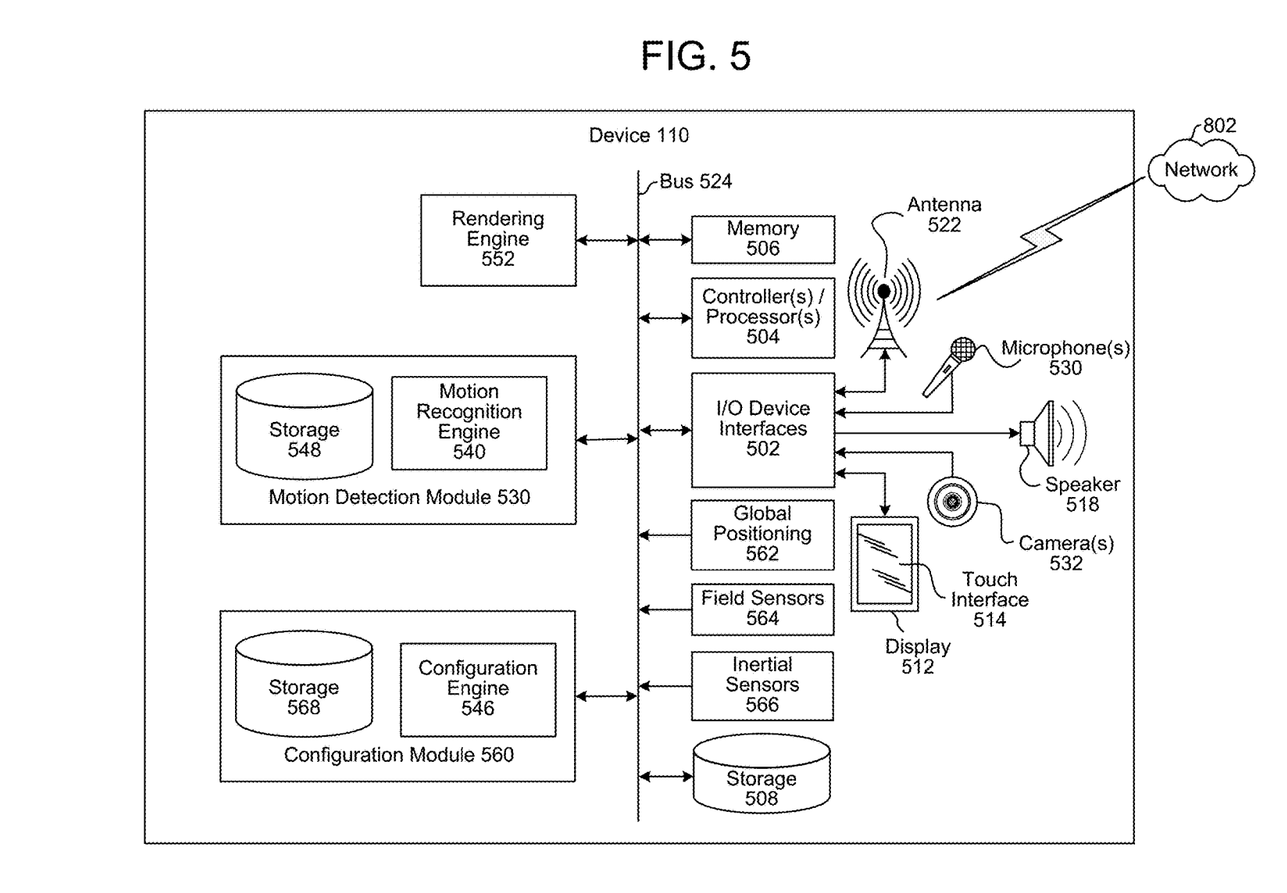
FIG. 5 is a block diagram conceptually illustrating example components of a device according to one aspect of the present disclosure.

FIG. 5 illustrates a block diagram conceptually illustrating components of a system to configured UI element movement described herein. Depending upon how the system is structured, some of components shown in FIG. 5 as part of a device 110 may be included in a remote server. In operation, the system 100 may include computer-readable and computer-executable instructions that reside in storage 508 on the device 110. The device 110 may be a mobile device, such as a smart phone, tablet, smart watch, or the like.

The device 110 may include one or more controllers/processors 504 comprising one-or-more central processing units (CPUs) for processing data and computer-readable instructions, and a memory 506 for storing data and instructions. The memory 506 may include volatile random access memory (RAM), non-volatile read only memory (ROM), non-volatile magnetoresistive (MRAM) and/or other types of memory. The device 110 may also include a data storage component 508 for storing data and processor-executable instructions. The data storage component 508 may include one or more non-volatile storage types such as magnetic storage, optical storage, solid-state storage, etc. The device 110 may also be connected to a removable or external non-volatile memory and/or storage (such as a removable memory card, memory key drive, networked storage, etc.) through the input/output device interfaces 502.

Executable instructions for operating the device 110, and its various components may be executed by the controller(s)/processor(s) 504, using the memory 506 as temporary "working" storage at runtime. The executable instructions may be stored in a non-transitory manner in non-volatile memory 506, storage 508, or an external device. Alternatively, some or all of the executable instructions may be embedded in hardware or firmware in addition to or instead of software.

As shown in FIG. 5, the device 110 may include one or more of a variety of sensors. Among the sensors are an audio capture component such as microphone(s) 530, an image and/or video capture component such as camera(s) 532, a touch interface 514, an antenna 522, global positioning sensors 562, field sensors 264 (e.g., a 3-axis magnetometer, a gravity sensor), and inertial sensors 566 (e.g., a 3-axis accelerometer, a 3-axis gyroscope). The device 110 may also include one or more buttons (not shown). Several of each of these components may be included. Also, although shown as integrated within device 110, some or parts of the various sensors may be external to device 110 and accessed through input/output device interfaces 502.

The antenna 522 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 530 or array of microphones, a wired headset (not illustrated), a wireless headset (e.g., wireless headset 821 in FIG. 8), etc. If an array of microphones is included, approximate distance to a sound's point of origin may be performed acoustic localization based on time and amplitude differences between sounds captured by different microphones of the array.

The touch interface 514 may be integrated with a surface of a display 512 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 562 provides an interface for acquiring location information, such as information from satellite geographic positioning system(s). For example, the global positioning module 562 may include a Global Positioning System (GPS) receiver and/or a Global Navigation Satellite System (GLONASS) receiver. The global positioning module 562 may also acquire location-based information using other radio sources (e.g., via antenna 522), such as mapping services that triangulate off of known WiFi service set identifiers (SSIDs) or cellular towers within range of the device 110.

The field sensor module 264 provides directional data. The field sensor module 264 may include a 3-axis magnetometer that measures magnetic fields and may serve as a compass. The field sensor module 264 may also include a dedicated gravity sensor to determine up-and-down.

The inertial sensor module 566 provides inertial data, and may include 3-axis accelerometer and a 3-axis gyroscope.

Examples of other sensors include an electronic thermometer to measure ambient temperature and a proximity sensor to detect whether there is an object within a certain distance of the device 110.

Sensors may be communicatively coupled with other components of system 100 via input/output (I/O) device interfaces 502 and/or via an address/data bus 524. The address/data bus 524 conveys data among components of the device 110. Each component within the device 110 may also be directly connected to other components in addition to (or instead of) being connected to other components across the bus 524.

The I/O device interfaces 502 may connect to a variety of components and networks. Among other things, the I/O device interfaces 502 may include an interface for an external peripheral device connection such as universal serial bus (USB), FireWire, Thunderbolt or other connection protocol. The input/output device interfaces 502 may also support a variety of networks via an Ethernet port and antenna 522.

The system 100 may also include a video output component for displaying images, such as display 512. The video output component may be a display of any suitable technology, such as a liquid crystal display, an organic light emitting diode display, electronic paper, an electrochromic display, a pico projector, etc. The video output component may be integrated into the device 110 or may be separate.

The system 100 may also include an audio output component such as a speaker 518, a wired headset (not illustrated), or a wireless headset (e.g., wireless headset 821). Other output devices include a haptic effect generator (not illustrated). The haptic effect generator may be of any haptics technology, including technologies to vibrate the entire device 110 (e.g., electromagnetic technologies such as vibratory motor or a coil with a central mass) and/or may comprise technologies allowing the haptic effect to be localized to a position of the touch interface 514, such as electroactive polymers, piezoelectrics, electrostatics, subsonic audio wave surface actuation, etc.

As discussed above, device 110 includes controller(s)/processors 504, memory 506, and storage 508. In addition, the device may include a motion detection module 530 and a rendering engine 552, each of which may comprise processor-executable instructions stored in storage 508 to be executed by controller(s)/processor(s) 504 (e.g., software, firmware), hardware, or some combination thereof. For example, components of the motion detection module 530 or rendering engine 552 may be part of a software application running in the foreground and/or background on the device 110. The rendering engine 552 actually renders, as in generates the appearance of, the graphical user interface.

The device 110 may include a motion detection module 530 which detects and processes motion of the device 110. The motion detection module 530 may include motion recognition engine 540, which processes data from various sensors of the device to detect and analyze device motion. The motion recognition engine 540 may then communicate with the rendering engine 552 to convert device movement into movement of one or more UI elements. The motion recognition engine may communicate with storage 548, which may store motion configurations and settings, such as those discussed above.

The device 110 may also include a configuration module 560, which may include a configuration engine 546 and storage 568. The configuration module 560 may process data, such as the data sets described above, to configure device operation. The configuration module 560 may reside on a remote server and/or may reside on a mobile device and be used to dynamically adjust/configure device-movement based UI control of the mobile device during runtime.

Figure 6:
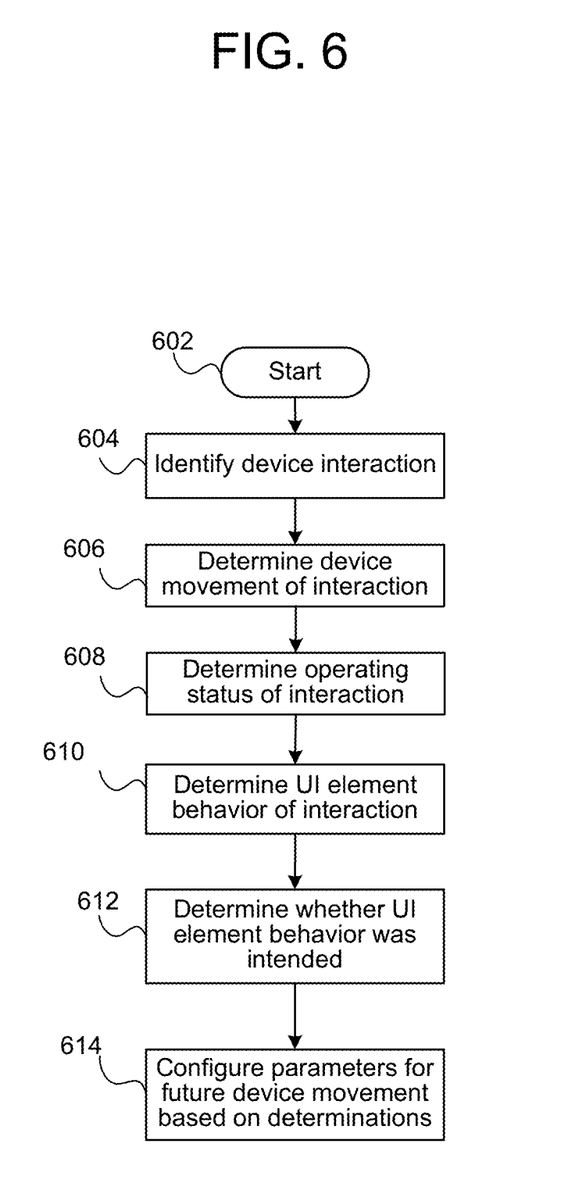
FIG. 6 is an example of an algorithm for configuring a magnet based physical model to control a user interface according to one aspect of the present disclosure.

FIG. 6 illustrates an example process for configuring UI element control by device movement. Following the start (602), the system identifies a movement event or device interaction (604). The event/interaction may be identified from a stored set of training data or from a live event as described by sensor data. The system then determines (606) movement of a device for the device interaction. Sensor data associated with the device interaction may be used to determine the movement. This sensor data may be determined from stored data or from live data. The system then may determine (608) the operating status of the interaction, such as whether an application was running, what particular user was operating the device, the make/model of the device, or other factors. The system may determine (610) UI element behavior of the interaction and whether the UI element behavior was intended (612). Intent may be inferred (such as for data collected during runtime) or may be known (such as for training set data). The system may then configure (614) or adjust parameters for controlling UI element movement in the future based on the above determinations.

Figure 7:
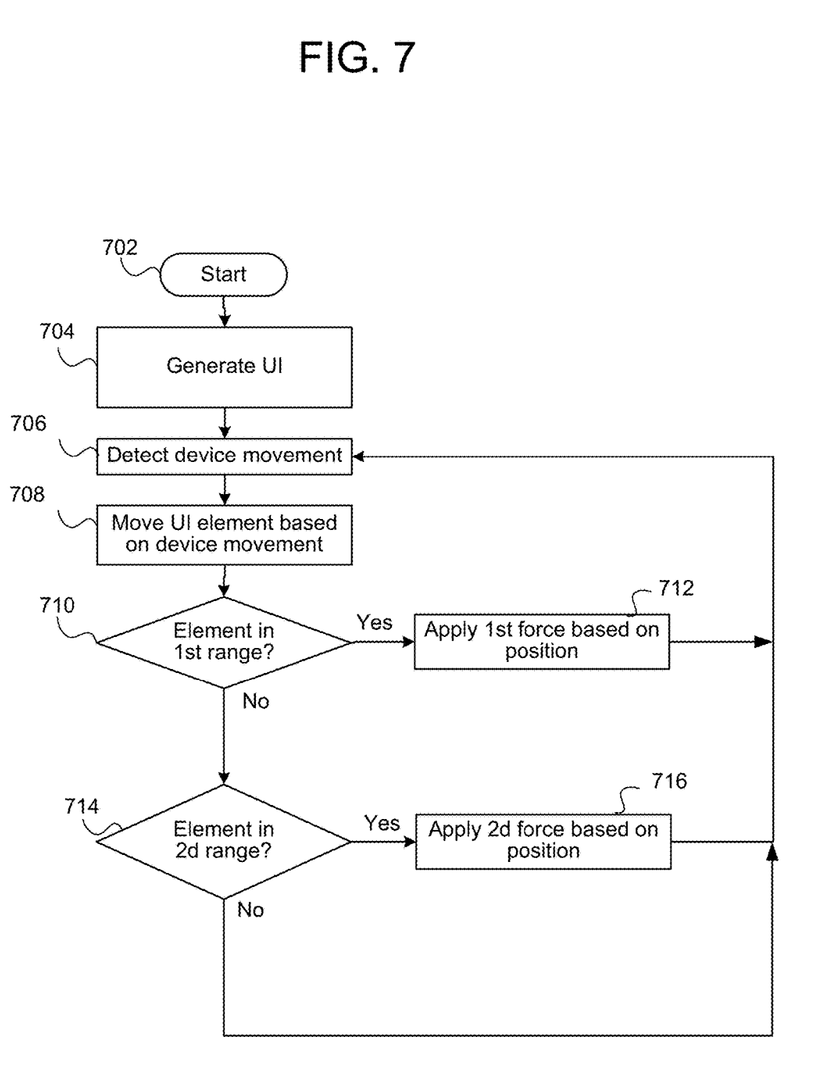
FIG. 7 is an example of an algorithm for controlling a user interface using a magnet based physical model according to one aspect of the present disclosure.

FIG. 7 illustrates controlling movement of a UI element based on device movement according to one aspect of the present disclosure. Following the start (702), a device generates a user interface (704). The device then detects device movement (706) and moves a UI element based on the device movement (708). If the UI element is in a position within a first range (710), the device applies (712) a first force based on the position of the UI element. If the UI element is in a position within a second range (714), the device applies (716) a second force based on the position of the UI element. The device then continues to detect device movement (706) and move UI elements (708) accordingly.

Figure 8:
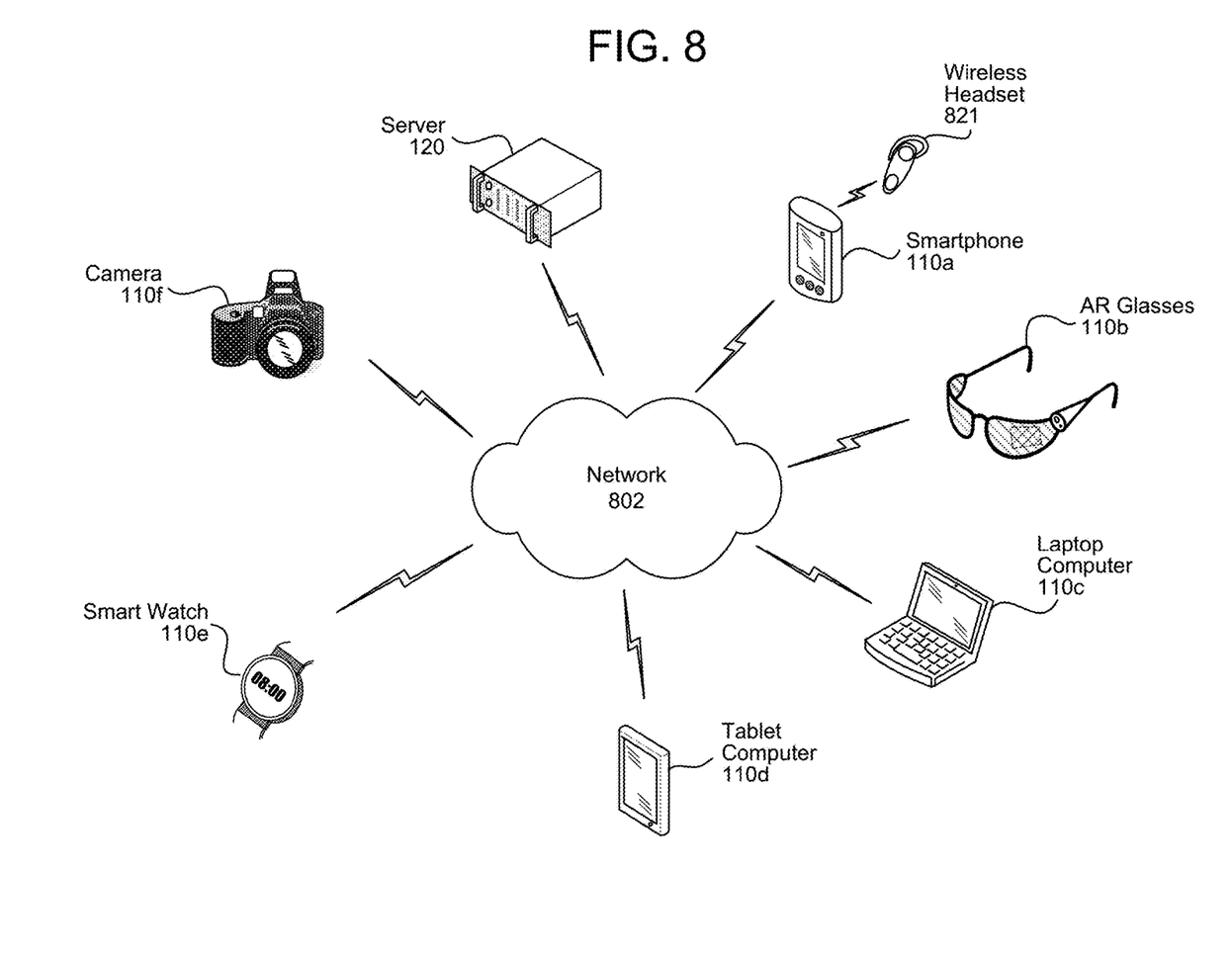
FIG. 8 illustrates an example of a computer network.

Referring to FIG. 8, different devices 110a to 110e may contain different components of the system 100 and the devices may be connected over a network 802 to one or more servers 120. For example, the smart phone 110a, and/or tablet computer 110c may each include the motion detection module 530, but the UI configuration module 560 may be located at the server 120. In the same system, the laptop computer 110b may include the motion detection module 530 but may refer to storage 508 located at a remote server 120. Also in the same system, the augmented reality (AR) glasses 110b and smart watch 110e may include the rendering engine 552, but motion detection may be performed by a connected server 120 or tablet 110c.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
generating a user interface (UI) on a display of a device;
detecting movement of the device;
based at least in part on the movement, causing an edge of a UI element to move from a first position on the UI to a second position on the UI and then to a third position on the UI, wherein:
the second position is between the first position and the third position,
when the edge is at the first position, the edge is aligned with a border of the display,
when the edge moves from the first position to the second position, the edge travels away from the border and a portion of the UI element becomes visible between the edge and the border, and
when the edge reaches the third position, an entirety of the UI element is visible between the edge and the border;
applying a first simulated magnetic force on the edge when the edge is between the first position and the second position, wherein the first simulated magnetic force biases the edge toward the first position and wherein the first simulated magnetic force is based on a first quadratic function; and
applying a second simulated magnetic force on the edge when the edge is between the second position and the third position, wherein the second simulated magnetic force biases the edge toward the third position and wherein the second simulated magnetic force is based on a second quadratic function.

2. The computer-implemented method of claim 1, wherein the edge is configured to engage in a physics-based sliding movement between the first position, the second position, and the third position in response to a rotational movement of the device.

3. The computer-implemented method of claim 1, wherein the second position is closer to the third position than to the first position.

4. A computing system, comprising:
a plurality of sensors that detect physical movement of a device;
at least one processor; and
at least one memory including instructions that, when executed by the at least one processor, cause the computing system to:
configure a portion of a user interface (UI) element to move between a first position of a UI, a second position of the UI, and a third position of the UI, wherein the second position is between the first position and third position;

based at least in part on the physical movement, move the portion of the UI element from the first position to the second position;

while moving the portion of the UI element from the first position to the second position, apply a first simulated force to the portion of the UI element, the first simulated force biasing the portion of the UI element away from the second position and toward the first position; and after the portion of the UI element moves from the first position to the second position, apply a second simulated force to the portion of the UI element, the second simulated force at least partially causing the portion of the UI element to move from the second position and toward the third position.

5. The computing system of claim 4, wherein at least a portion of movement of the portion of the UI element is proportional to the physical movement.

6. The computing system of claim 4, wherein at least a portion of movement, of the portion of the UI element, is based on a dampening of the physical movement.

7. The computing system of claim 4, wherein the first simulated force varies based at least in part on a position of the portion of the UI element on the UI.

8. The computing system of claim 4, wherein the first simulated force is based on $p^2$, where p is a position of the portion of the UI element between the first position and the second position.

9. The computing system of claim 4, wherein the second simulated force is based on $p^2$, where p is a position of the portion of the UI element between the second position and the third position.

10. The computing system of claim 4, wherein the at least one memory further includes instructions that, when executed by the at least one processor, further cause the computing system to:

based at least in part on the portion of the UI element arriving at the first position or the third position, produce at least one of an audio feedback or a haptic feedback.

11. The computing system of claim 4, wherein the UI element becomes increasingly visible on a display as the portion of the UI element moves from the first position to the second position.

12. A computer-implemented method, comprising:

configuring a portion of a user interface (UI) element to move between a first position of a UI, a second position of the UI, and a third position of the UI, wherein the second position is in between the first position and third position;

based at least in part on the physical movement, moving the portion of the UI element from the first position to the second position;

while moving the portion of the UI element from the first position to the second position, applying a first simulated force to the portion of the UI element, the first simulated force biasing the portion of the UI element away from the second position and toward the first position; and after the portion of the UI element moves from the first position to the second position, applying a second simulated force to the portion of the UI element, the second simulated force at least partially causing the portion of the UI element to move from the second position and toward the third position.

13. The computer-implemented method of claim 12, wherein at least a portion of movement, of the portion of the UI element, is proportional to the physical movement.

14. The computer-implemented method of claim 12, wherein at least a portion of movement, of the portion of the UI element, is based on a dampening of the physical movement.

15. The computer-implemented method of claim 12, wherein the first simulated force varies based at least in part on a position of the portion of the UI element on the UI.

16. The computer-implemented method of claim 12, wherein the first simulated force is based on $p^2$, where p is a position of the portion of the UI element between the first position and the second position.

17. The computer-implemented method of claim 12, wherein the second simulated force is based on $p^2$, where p is a position of the portion of the UI element between the second position and the third position.

18. The computer-implemented method of claim 12, wherein the UI element becomes increasingly visible on a display as the portion of the UI element moves from the first position to the second position.

19. The computing system of claim 4, wherein the UI element is at least partially opaque, the UI element configured to be presented over other UI elements presented on a display of the device.

20. The computer-implemented method of claim 12, wherein the UI element is at least partially opaque, the UI element configured to be presented over other UI elements presented on a display of the device.

* * * * *